United States Patent
Feng et al.

(10) Patent No.: US 10,705,872 B2
(45) Date of Patent: *Jul. 7, 2020

(54) PREDICTIVE VIRTUAL SERVER SCHEDULING AND OPTIMIZATION OF DYNAMIC CONSUMABLE RESOURCES TO ACHIEVE PRIORITY-BASED WORKLOAD PERFORMANCE OBJECTIVES

(71) Applicant: INTERNATIONAL BUSINESS MACHINES CORPORATION, Armonk, NY (US)

(72) Inventors: Yong Feng, Unionville, CA (US); Yuksel Gunal, New York, NY (US); Xiao Liang Hu, Xian (CN); Peter B. Yocom, Lagrangeville, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 168 days.

This patent is subject to a terminal disclaimer.

(21) Appl. No.: 15/372,772

(22) Filed: Dec. 8, 2016

(65) Prior Publication Data

US 2018/0165109 A1    Jun. 14, 2018

(51) Int. Cl.
*G06F 9/48* (2006.01)
*G06F 9/50* (2006.01)

(52) U.S. Cl.
CPC .......... *G06F 9/4831* (2013.01); *G06F 9/4887* (2013.01); *G06F 9/505* (2013.01); *G06F 9/5077* (2013.01)

(58) Field of Classification Search
CPC ... G06F 2009/4557; G06F 2009/45595; G06F 9/45558; G06F 9/4831; G06F 9/4887; G06F 9/505; G06F 9/5077
See application file for complete search history.

(56) References Cited

U.S. PATENT DOCUMENTS 8,676,976 B2   3/2014 Heller, Jr.
8,843,933 B1   9/2014 Holler et al.
(Continued)

OTHER PUBLICATIONS

Dabbagh, et al., "Smart Energy Management in Data Centers"; ip.com; IP.com No. IPCOM000246061D, IP.com Electronic Publication Date: Apr. 29, 2016; 10 pgs.
(Continued)

*Primary Examiner* — James J Lee
*Assistant Examiner* — Jorge A Chu Joy-Davila
(74) *Attorney, Agent, or Firm* — Cantor Colburn LLP; Teddi Maranzano (57) ABSTRACT

Embodiments include a technique for predictive virtual server scheduling and optimization of dynamic consumable resources to achieve priority-based workload performance objectives is provided. Techniques include calculating a capacity requirement for each virtual server based on an administrator defined performance objective for each virtual server. Techniques also include calculating an available CPU capacity for each importance level based on the calculated capacity requirement for each virtual server, sending the calculated available CPU capacity to a scheduler; and selecting a target hypervisor based on the calculated capacity requirement of each virtual server and the calculated available CPU capacity at each importance level of each hypervisor.

8 Claims, 8 Drawing Sheets

(56) References Cited

U.S. PATENT DOCUMENTS

| | | | | |
|---|---|---|---|---|
| 2006/0195715 A1* | 8/2006 | Herington | ............. | G06F 9/5077 714/4.2 |
| 2010/0325634 A1* | 12/2010 | Ichikawa | ............. | G06F 9/4856 718/103 |
| 2011/0185063 A1* | 7/2011 | Head | ............. | G06F 9/5077 709/226 |
| 2011/0288847 A1 | 11/2011 | Narayanan et al. | | |
| 2013/0219385 A1* | 8/2013 | Geibel | ............. | G06F 9/45558 718/1 |
| 2015/0052528 A1* | 2/2015 | French | ............. | G06F 9/4856 718/1 |
| 2015/0373093 A1* | 12/2015 | Ashok | ............. | G06F 9/45558 709/223 |

OTHER PUBLICATIONS

Disclosed Anonymously "Power-aware VM scheduling in a Cloud data center", ip.com; IP.com No. IPCOM000196870D; IP.com Electronic Publication Date: Jun. 18, 2010; 3 pgs.

Disclosed Anonymously "System and method for network load balancing in a cloud environment", ip.com; IP.com No. IPCOM000240937D; IP.com Electronic Publication Date: Mar. 12, 2015; 5 pgs.

Hu et al., "I/O Behavior Characterizing and Predicting of Virtualization Workloads", Journal of Computers, vol. 7, No. 7, Jul. 2012; 14 pgs.

Mel, et al., "The NIST Definition of Cloud Computing", National Institute of Standards and Technology, U.S. Dept of Commerce, Special Publication 800-145; pp. M-7 through M-13.

List of IBM Patents or Patent Applictions Treated As Related; (Appendix P), Filed Feb. 16, 2017 2 pages.

Yong Feng et al., Pending U.S. Appl. No. 15/434,091 entitled "Predictive Virtual Server Scheduling and Optimization of Dynamic Consumable Resources to Achieve Priority-Based Workload Performance Objectives," filed Feb. 16, 2017.

* cited by examiner

| Host CPU Capacity | Hypervisor 1 | Hypervisor 2 |
|---|---|---|
| $R^t$ | 16 | 8 |
| $R^c$ | VM1 consumed 4<br>VM2 consumed 4 | VM3 consumed 2<br>VM4 consumed 4 |
| $R^a$ | 16 − (4 + 4) = 8 | 8 − (2 + 4) = 2 |

FIG.7

US 10,705,872 B2

PREDICTIVE VIRTUAL SERVER SCHEDULING AND OPTIMIZATION OF DYNAMIC CONSUMABLE RESOURCES TO ACHIEVE PRIORITY-BASED WORKLOAD PERFORMANCE OBJECTIVES

BACKGROUND

The present disclosure relates to performance management, and more specifically, to predictive virtual server scheduling and optimization of dynamic consumable resources to achieve priority-based workload performance objectives.

An Infrastructure as a Service cloud environment is commonly implemented as a set of hypervisors managed by cloud management software such as OpenStack. A consumer can contract with the provider for virtual infrastructure such as virtual servers. This contract may include the performance requirement for the workloads that the consumer will host on the virtual infrastructure provided to him.

A hypervisor is a piece of computer software, firmware or hardware that creates and runs virtual machines. The hypervisor presents the guest operating systems with a virtual operating platform and manages the execution of the guest operating systems. Multiple instances of a variety of operating systems may share the virtualized hardware resources. The resources must be managed when allocating the resources in a cloud computing environment.

SUMMARY

In accordance with an embodiment of the invention, a computer-implemented method, a computer program product, and a system for predictive virtual server scheduling and optimization of dynamic consumable resources to achieve priority-based workload performance objectives is provided.

A computer-implemented method for predictive virtual server scheduling and optimization of dynamic consumable resources to achieve priority-based workload performance objectives is provided. The method includes calculating a capacity requirement for each virtual server based on an administrator defined performance objective for each virtual server. Techniques also include calculating an available CPU capacity for each importance level based on the calculated capacity requirement for each virtual server, sending the calculated available CPU capacity to a scheduler; and selecting a target hypervisor based on the calculated capacity requirement of each virtual server and the calculated available CPU capacity at each importance level of each hypervisor.

A computer program product for predictive virtual server scheduling and optimization of dynamic consumable resources to achieve priority-based workload performance objectives is provided. The computer program product includes a computer readable storage medium having stored thereon first program instructions executable by a processor to cause the processor to calculate a capacity requirement for each virtual server based on an administrator defined performance objective for each virtual server. The instructions are further executable by a processor to cause the processor to calculate an available CPU capacity for each importance level based on the calculated capacity requirement for each virtual server, send the calculated available CPU capacity to a scheduler; and select a target hypervisor based on the calculated capacity requirement of each virtual server and the calculated available CPU capacity at each importance level of each hypervisor.

A system for predictive virtual server scheduling and optimization of dynamic consumable resources to achieve priority-based workload performance objectives is provided. The system includes a scheduler, one or more hypervisors, a hypervisor resource optimizer module located on each hypervisor and a storage medium, the storage medium being coupled to a processor. The processor is configured to calculate a capacity requirement for each virtual server based on an administrator defined performance objective for each virtual server. The processor is further configured to calculate an available CPU capacity for each importance level based on the calculated capacity requirement for each virtual server, send the calculated available CPU capacity to a scheduler; and select a target hypervisor based on the calculated capacity requirement of each virtual server and the calculated available CPU capacity at each importance level of each hypervisor.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

In accordance with exemplary embodiments of the disclosure, methods, systems and computer program products for predictive virtual server scheduling and optimization of dynamic consumable resources to achieve priority-based workload performance goals are provided.

In an embodiment, a technique for initial placement decisions for virtual servers across the available hypervisors is described herein. In another embodiment, a technique for managing the local resources within each hypervisor is provided. In a different embodiment, a live migration of virtual servers from a hypervisor that does not have sufficient resources at a given time to meet performance objectives to a hypervisor that does is also described.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
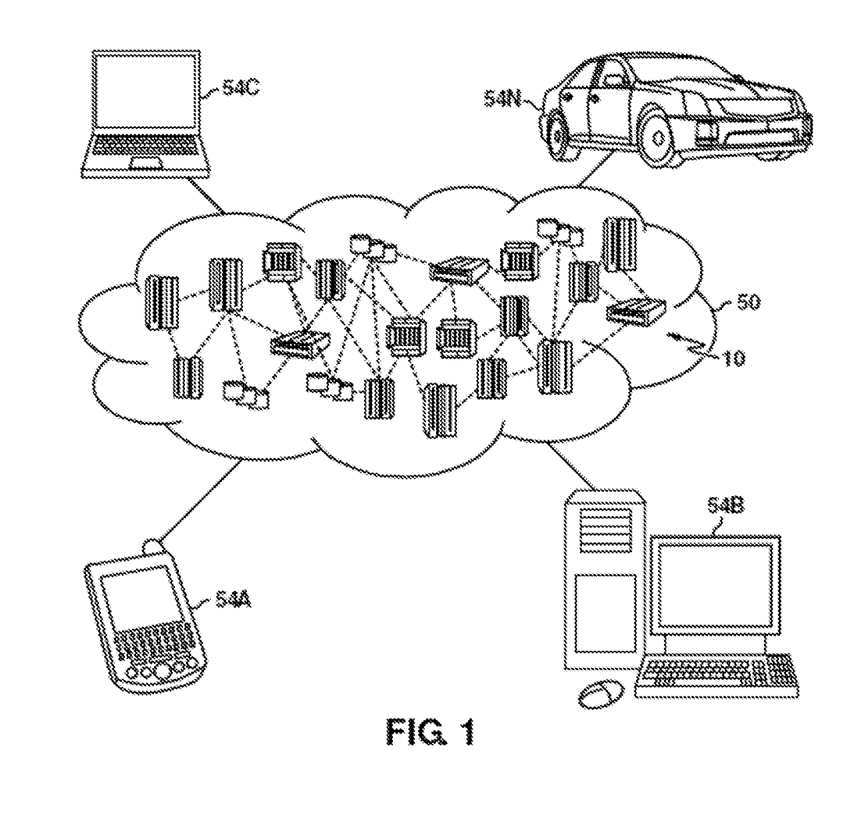
FIG. 1 depicts a cloud computing environment according to one or more embodiments of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
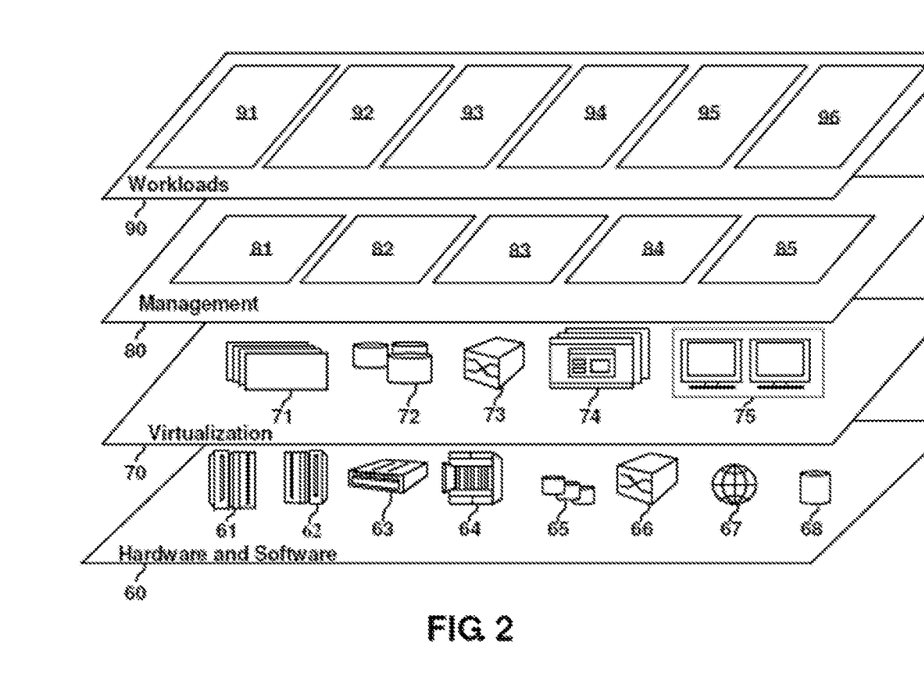
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and action analytics and notifications 96.

The cloud management layer of the stack includes a virtual server scheduling function that determines how new virtual servers are placed across the hypervisors in the environment. The IBM Platform Resource Scheduler (PRS) is an example of such a scheduling function for the OpenStack environment. Each hypervisor is responsible for managing how its local resources are allocated to the virtual servers that are hosted on that hypervisor.

A scheduler makes scheduling decisions based on an understanding of the resources (CPU and memory) available on each hypervisor. A hypervisor resource optimizer provides a policy based approach to local resource management within a hypervisor. The hypervisor resource optimizer also makes decisions based on achieving performance goals and takes actions to achieve the performance goals of the most important workloads when there are insufficient resources to achieve all performance goals.

When there are insufficient resources to achieve the performance goals on a hypervisor, the performance can be improved by relocating virtual servers to a better performing hypervisor. In one or more embodiments, a mechanism to select the most optimal target hypervisor is utilized by taking into account the business importance levels and performance objectives assigned to workloads running in the environment.

In one or more embodiments, the hypervisor resource optimizer on each hypervisor periodically sends metrics to the scheduler providing the capacity available to achieve its performance goals. However, the scheduler can make placement decisions between updates from the hypervisor resource optimizer. In these cases, the hypervisor resource optimizer data is out of synchronization with the actual state of the environment. In such a situation, the scheduler should make projections based on the limited data and then synchronize the data when feedback data arrives from the involved hypervisor resource optimizer.

In one or more embodiments, the scheduler and hypervisor resource optimizer are both used to coordinate resource management decisions based on shared performance policies. These performance policies define the relative importance of the workloads being hosted and define performance objectives for the virtual servers supporting these workloads. The scheduler collects data from hypervisor resource optimizer of each hypervisor. Both the scheduler and hypervisor resource optimizer work from common performance policies, but each makes decisions within their scope of management independently.

Figure 3:
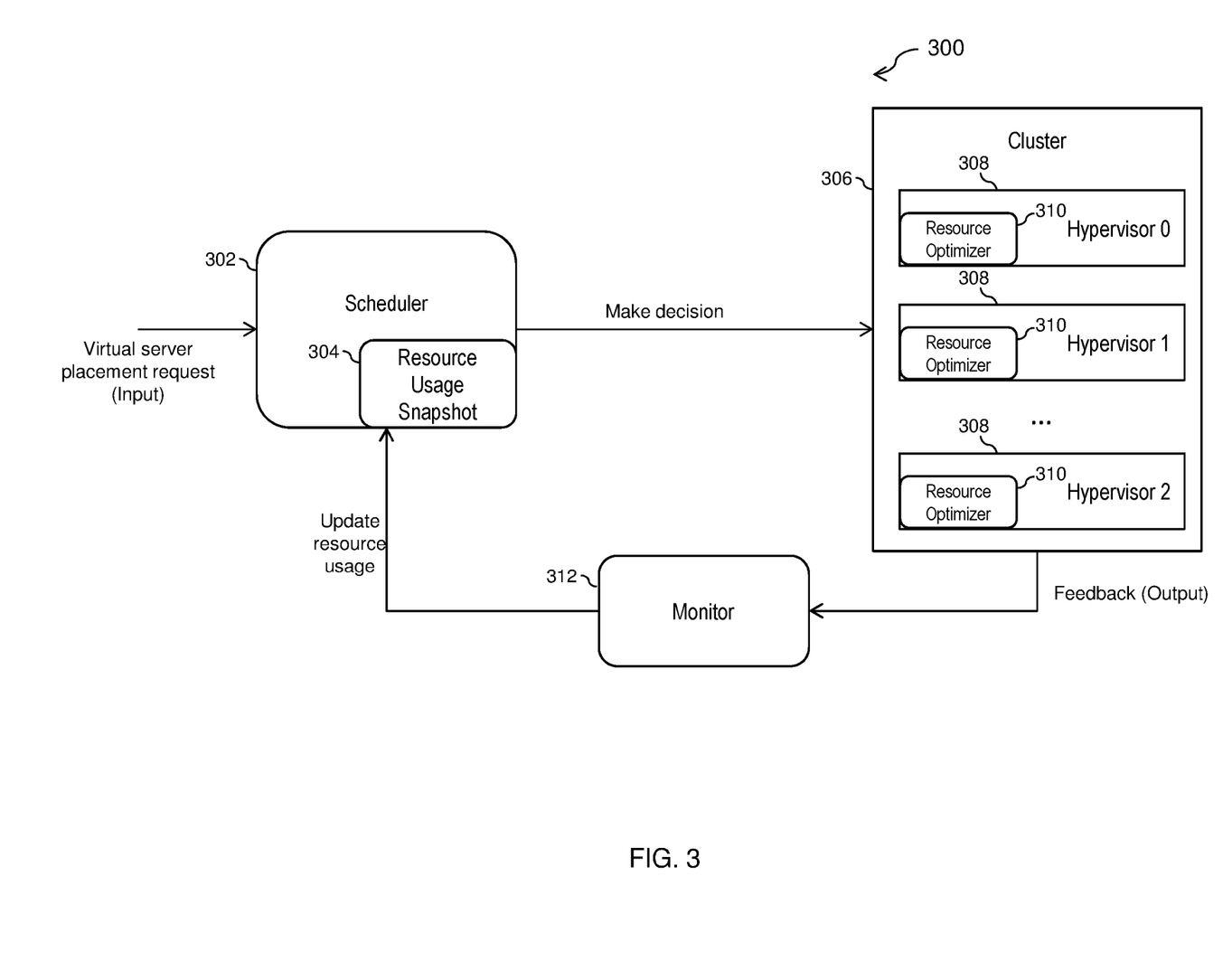
FIG. 3 illustrates a system for predictive virtual server scheduling and optimization of dynamic consumable resources to achieve priority-based workload performance objectives.

Now referring to FIG. 3, a system 300 is provided. In system 300 a scheduler 302 is provided and maintains a resource usage snapshot 304 for each hypervisor. The resource usage snapshot is used for selecting a target hypervisor for initial placement of a new virtual server and/or migration of a virtual server off an over utilized hypervisor. The resource usage snapshot 304 contains data for each importance level. The importance level of a workload specifies how important it is to one's business that this workload is meeting its goal(s). The importance level defines which workload the system should prefer and from which workload to take resources if resources become scarce in the system. In one or more embodiments, 25 levels of importance are used.

The importance level data indicates how much additional CPU capacity can be used on the hypervisor without causing the virtual servers hosted on the hypervisor to miss their performance objectives. In one or more embodiments, the performance objective is a velocity goal. A velocity goal is a goal type that defines the acceptable amount of delay for work when work is ready to run. Cluster 306 is depicted including a number of hypervisors 308. These hypervisor can run on compute nodes (as shown in FIG. 1, element 10) and can be provided in the virtualization layer (as shown in FIG. 2, element 70). In an embodiment, one or more hypervisors can be included in the cluster. Each hypervisor 308 comprises a hypervisor resource optimizer 310 for collecting and reporting the CPU capacity metrics. A monitor 312 is shown as monitoring the CPU capacity metrics and further reporting and/or forwarding the metrics to the scheduler 302. The scheduler 302 maintains the metrics of each of the hypervisors 308 in the cluster 306 in the resource usage snapshot 304.

Figure 4:
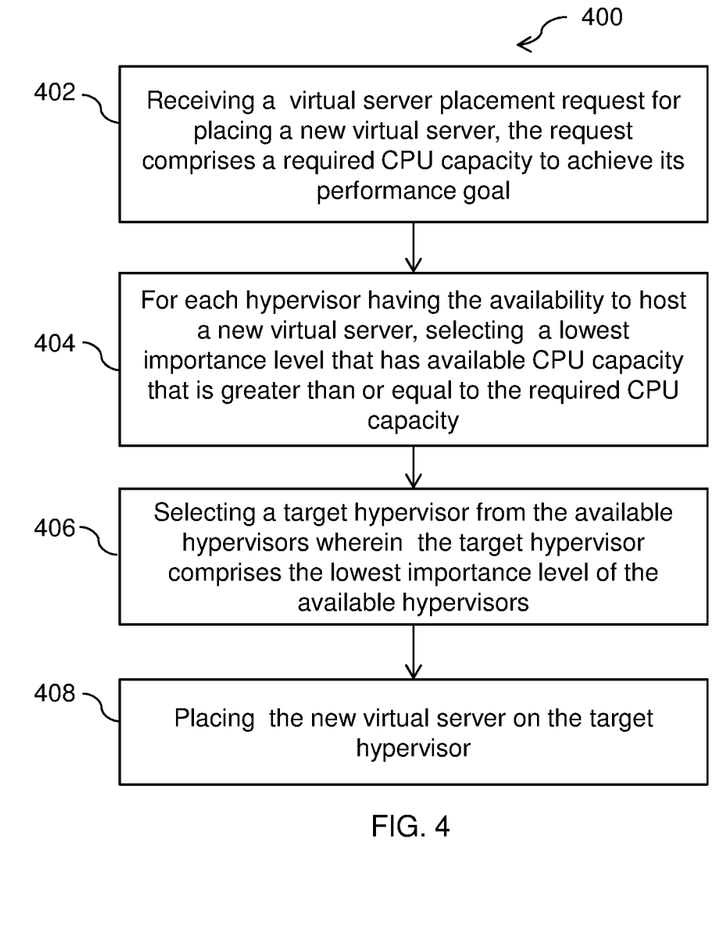
FIG. 4 provides a flow diagram of a method for predictive virtual server scheduling and optimization of dynamic consumable resources to achieve priority-based workload performance objectives in accordance with one or more embodiments.

FIG. 4 shows a flow diagram 400 for placing a new virtual server based on the resource usage snapshot maintained by the scheduler. At block 402 the scheduler receivers a virtual server placement request for placing a new virtual server, the request comprises a required CPU capacity to achieve its performance goal. At block 404 for each hypervisor having the availability to host a new virtual server, selecting a lowest importance level that has available CPU capacity that is greater than or equal to the required CPU capacity is shown. In one or more embodiments, an available host for the new virtual server is determined when the scheduler searches the resource usage snapshot to select the lowest importance level where the CPU capacity required by the new virtual server can be used without causing virtual servers at that importance level to miss their performance objectives.

At block 406 the scheduler selects a target hypervisor from the available hypervisors, wherein the target hypervisor comprises the lowest importance level of the available hypervisors. In one or more embodiments, the scheduler compares the selected importance level for each available hypervisor and chooses the hypervisor with the lowest selected importance level as the target hypervisor. If multiple hypervisors have the same lowest importance level, the hypervisor with the most available capacity at that importance level is chosen as the target hypervisor. At block 408 the new virtual server is placed on the target hypervisor.

The following describes a technique for projecting the CPU capacity required for a virtual server to achieve a velocity goal. A velocity goal is a form of performance objective used in the IBM z Systems. In an embodiment, the CPU capacity required for a virtual server to achieve a performance objective is projected. A performance index (PI) can be calculated by the following:

$$PI = \frac{V_g}{V} = \frac{V_g}{\frac{100 U_0}{U_0 + D_0}} = \frac{V_g}{\frac{100}{1 + U_0/D_0}} \qquad \text{Eq. 1}$$

where $V_g$ is the velocity performance objective assigned to the virtual server; $D_0$ is the current value of the hypervisor CPU delay experienced by virtual server; $U_0$ is the current value of the CPU usage metric; PI is the performance index that will be calculated as a function of its performance object $V_g$; and V is the actual performance.

Note that we define the actual performance V as:

$$V = \frac{100 U_0}{U_0 + D_0} \quad \text{Eq. 2}$$

Figure 5:
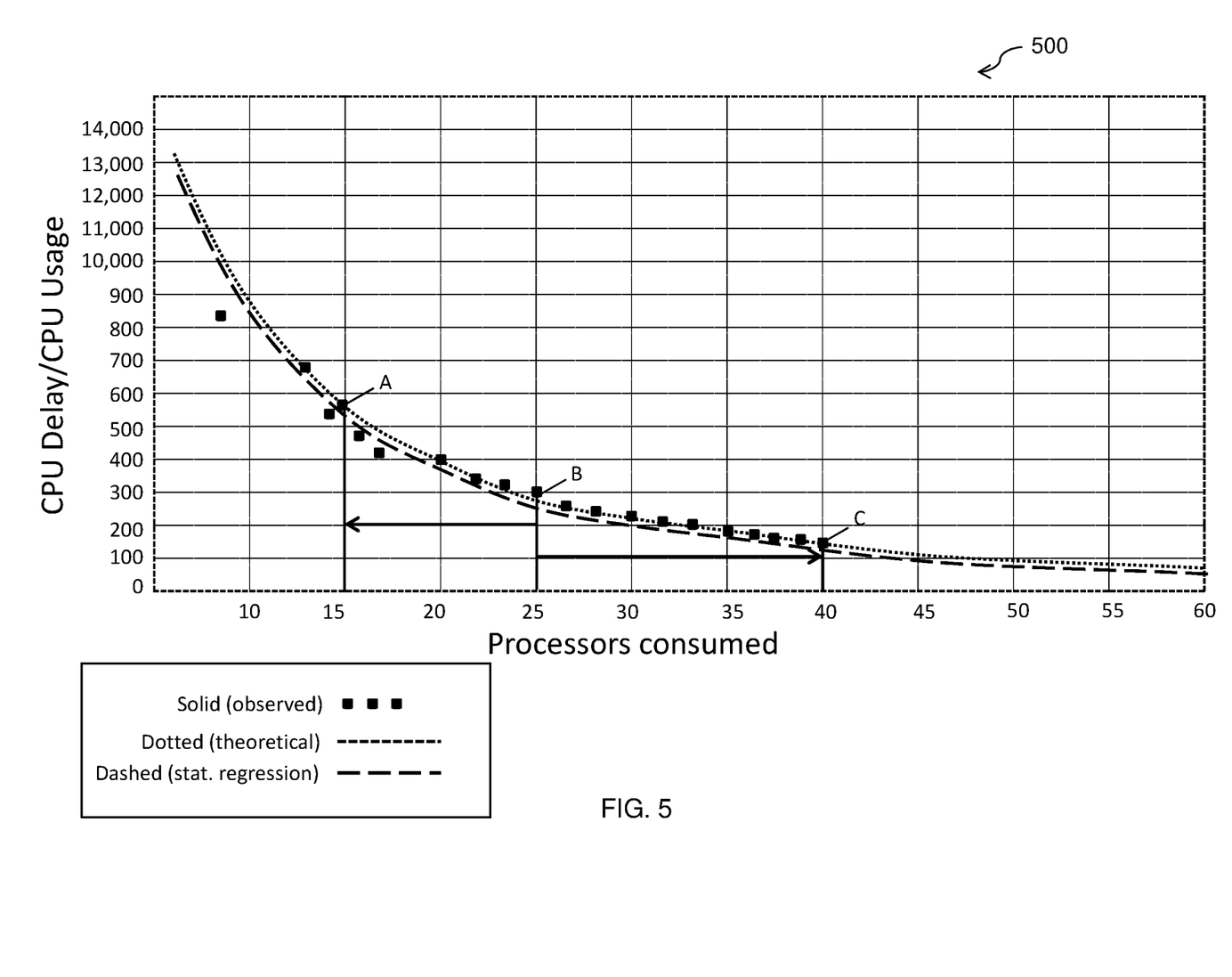
FIG. 5 illustrates an example plot used in accordance with one or more embodiments.

The CPU capacity required for this virtual server to achieve its performance objective is determined as follows:

A plot is generated of the ratio of hypervisor CPU delay (D) over CPU usage (U) vs processor consumption (u) for the given virtual server. FIG. 5 provides an example plot 500 in accordance with an embodiment. These projections are based on Eq. 3 and Eq. 4 shown below. The solid line represents the collected data points during run time. The dotted line represents theoretical numbers calculated based on a model of full contention for CPU resources in the virtualized environment. In one or more embodiments, the plot 500 will be updated periodically as the new set of metrics for the hypervisor CPU delay and CPU usage are collected during run time.

Next a calculation of what the ratio of $D_g/U_g$ should be is performed using Eq. 1 by setting PI to 1 (the level at which performance goal is met). Here $D_g$ and $U_g$ are the hypervisor CPU delay and CPU usage at a performance objective g, respectively.

A linear regression is run to fit the data on the plot discussed in step 1 to a function of $$f(u) = \frac{a}{u} + b.$$

Here f(u) is the estimate of the value of D/U at processor utilization u. Linear regression essentially estimates what a and b should be.

With $D_g/D_g$ and linear regression from the previous steps, a calculation for what processor utilization $u_g$ will be performed as shown in Eq. 4 below. This will be the capacity requirement to meet the performance objective $V_g$.

$$f(u_g) = \frac{D_g}{U_g} = \frac{a}{U_g} + b \quad \text{Eq. 3}$$

Evaluating for $u_g$, the capacity requirement to achieve the performance objective results in the following:

$$u_g = \frac{a}{D_g/U_g - b} \quad \text{Eq. 4}$$

Example plot 500 illustrates the arrow from point B to point A is an example of projecting the impact of taking away CPU resources from a virtual server. The arrow from point B to point C is an example of projecting the impact of giving CPU resources to a virtual server.

In one or more embodiments, a solution for selecting a target hypervisor when initial placement of a virtual server and/or migration off of an over utilized hypervisor is provided. The selection of the target hypervisor relies on the projection of the available CPU capacity at a given business importance level on a given hypervisor. The business level importance provides a relative importance to other business importance levels. Given the capacity requirement for a new virtual server to be placed on a hypervisor, the available CPU capacity projections are calculated at each importance level on every hypervisor being considered as a target for migration, and the hypervisor having the most CPU capacity available at the lowest importance level will be selected as the target hypervisor for migration. In an embodiment, the hypervisor where the least important workloads will be impacted due to the placement of a new virtual server will be selected as the target hypervisor.

Figure 6A:
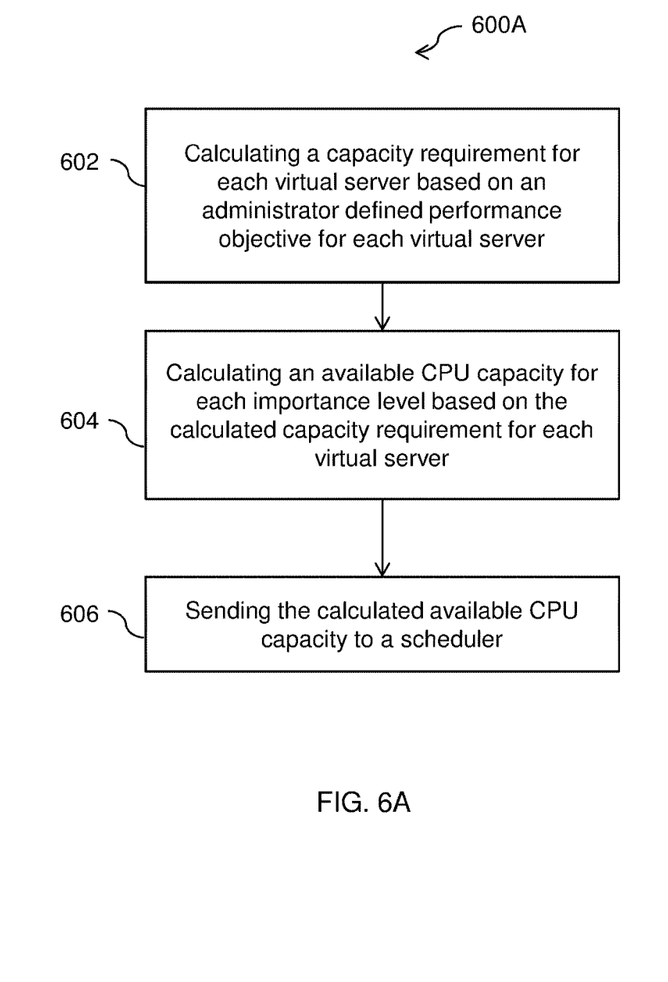
FIGS. 6A and 6B illustrates flow diagrams of a method for predictive virtual server scheduling and optimization of dynamic consumable resources to achieve priority-based workload performance objectives in accordance with one or more embodiments.

FIG. 6A provides a flow diagram 600 in accordance with an embodiment for predictive virtual server scheduling and optimization of dynamic consumable resources to achieve priority-based workload performance objectives. Block 602 includes calculating a capacity requirement for each virtual server based on an administrator defined performance objective for each virtual server. In one or more embodiments, each hypervisor resource optimizer calculates the CPU capacity metrics for its hypervisor to be used by the scheduler, where the scheduler selects a target hypervisor for placement of a new virtual server of a virtual server being migrated.

Block 604 includes calculating an available CPU capacity for each importance level based on the calculated capacity requirement for each virtual server. In an embodiment the capacity requirement for each virtual server is based on the performance objective for each virtual server. In one or more embodiments, the performance objective is an administrator defined performance objective. The available CPU capacity at an importance level represents the capacity that can be used on the hypervisor without causing virtual server at the importance level to miss their performance objectives. The available CPU capacity $A_j^h$ at a given importance level j for a hypervisor h is calculated as follows:

$$A_j^h = (A_{j-1}^h - \Sigma_i u_{j,i}^g) \quad \text{Eq. 5}$$

where $A_{j-1}^h$ is the available CPU capacity of the hypervisor h at an importance level j−1 and $u_{j,i}^g$ is the capacity required for virtual server i to meet its performance objective g and the sum i runs over all virtual servers at the importance level j.

Also, the boundary condition for j=0 is $$A_j = N - U \quad \text{Eq. 6}$$

where N is the total number of physical CPUs the hypervisor has; U is the hypervisor overhead, that is, the CPU capacity consumed by hypervisor processes. At block 606, after calculating the available CPU capacity $A_j$ for all importance levels j are calculated, the available CPU capacities are sent to a scheduler.

Figure 6B:
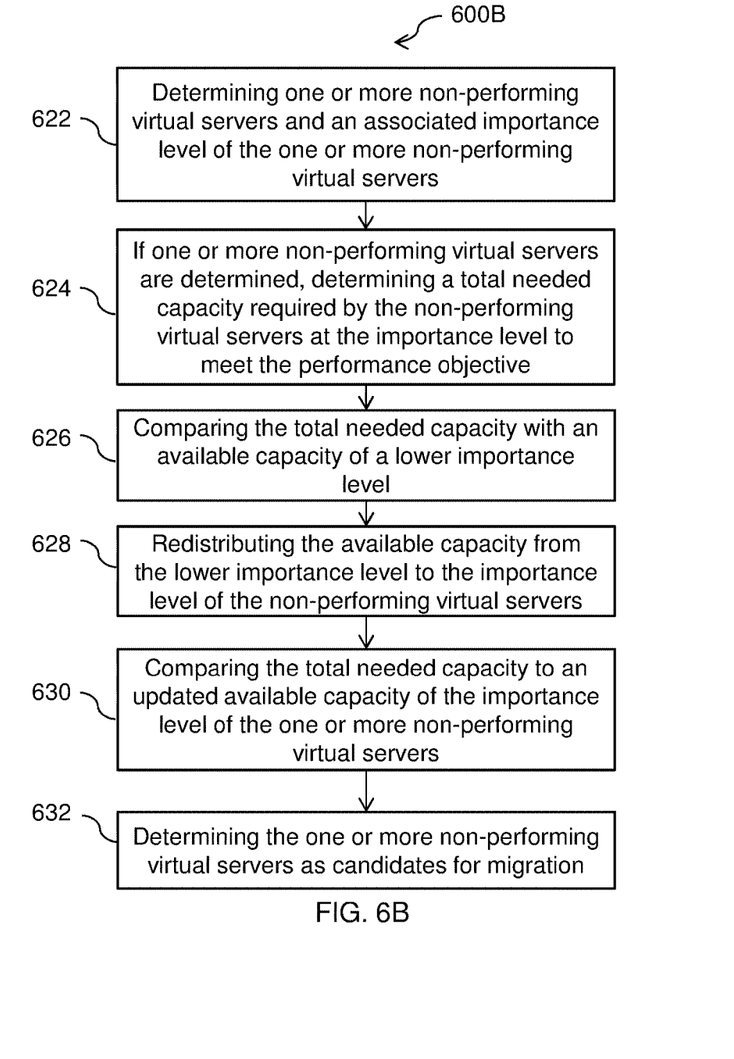

Now referring to FIG. 6B, a flow chart 600B for selecting migration candidates in accordance with an embodiment is shown. Block 622 provides determining one or more non-performing virtual servers and an associated importance level of the one or more non-performing virtual servers.

Block 624 provides if one or more non-performing virtual servers are determined, determining a total needed capacity required by the non-performing virtual servers at the importance level to meet the performance objective.

Block 626 provides comparing the total needed capacity with an available capacity of a lower importance level. As shown at block 628, the method includes redistributing the available capacity from the lower importance level to the importance level of the non-performing virtual servers. In an embodiment, the lower importance level is the adjacent lower importance level of the importance level of the non-performing virtual servers.

Block 630 provides comparing the total needed capacity to an updated available capacity of the importance level of the one or more non-performing virtual servers. In one or more embodiments, the updated available capacity includes the sum of the available capacity and the redistributed capacity of the lower importance level(s). The redistributed capacity of the lower importance level(s) is equally distributed to each virtual server of the importance level. The following equation determines whether there are enough resources available at a lower importance level for virtual server to perform within its performance objectives:

$$\Delta C_k > (A_{j-1}^h - \Sigma_i u_{j,i}^g) \qquad \text{Eq. 7}$$

where $\Delta C_k$ is the number of processing units needed for a virtual server k to meet its performance objective, and where $A_{j-1}^h$ is the available CPU capacity of the hypervisor h at an importance level j−1 and $u_{j,i}^g$ is the capacity required for virtual server i to meet its performance objective g and the sum i runs over all virtual servers at the importance level j. Eq. 7 provides that if the amount of available resources at importance levels below that of this virtual server's importance level is less than what this virtual server needs to meet its performance objective, such virtual servers will be marked as candidates for migration.

Block 632 provides determining the one or more non-performing virtual servers as candidates for migration. In one or more embodiments the virtual servers are flagged as candidates for migration out of the hypervisor. In another embodiment, the virtual servers are added and ranked in a list of candidates for migration. In an embodiment, if the updated available capacity is sufficient, the virtual servers will not be marked for migration as the updated available capacity including the redistributed capacity is projected to bring the operation of the virtual servers within the performance objectives.

In one or more embodiments, the scheduler chooses a new destination hypervisor to move a selected virtual server to. The technique for selecting a target hypervisor for the virtual server to migrate to is the same as the technique for placing a new virtual server to a hypervisor.

In one or more embodiments, a hypervisor resource optimizer module can be installed on each hypervisor to collect dynamic consumable resource usage data including available CPU capacity by importance level and periodically report metrics to the scheduler. In the scheduler, the dynamic consumable resource has 3 attributes which will be subsequently defined. The total capacity $R^t$ is periodically updated and collected by the hypervisor resource optimizer located on the hypervisor. The consumed capacity $R^c$ gets internally updated by a scheduler based on virtual server resource request. $R^c$ is calculated over all virtual server resource consumption. It is increased when resources are reserved for virtual server creation and reduced when virtual servers gets removed. The available capacity $R^a$ is calculated as follows:

$$R^a = R^t - R^c \qquad \text{Eq. 8}$$

where $R^t$—total capacity; $R^c$—consumed capacity; $R^a$—available capacity.

Figure 7:
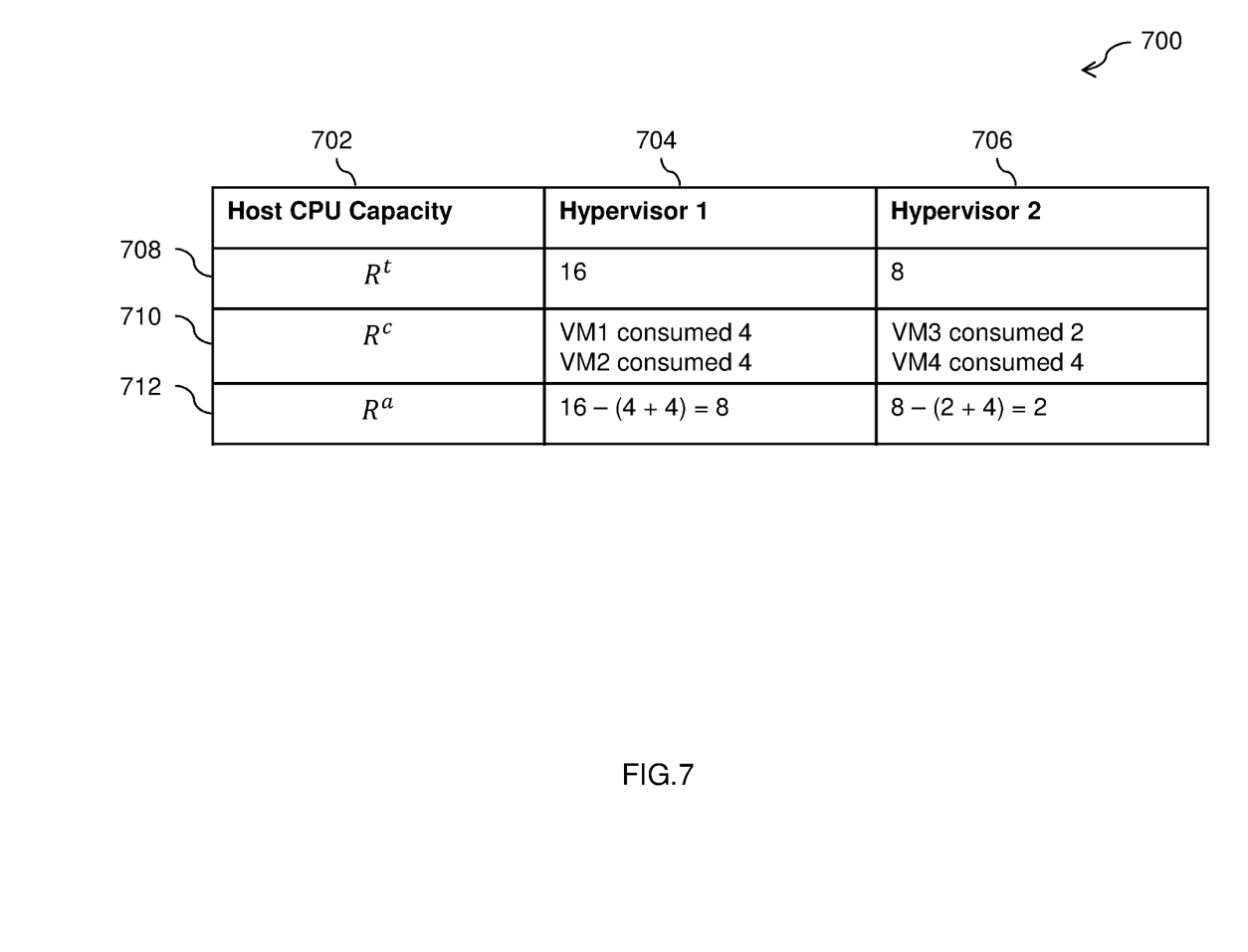
FIG. 7 illustrates an example in accordance with an embodiment.

Referring now to FIG. 7, an example table 700 in accordance with an embodiment is provided. Host CPU capacity is provided in column 702 and hypervisor 1 and hypervisor 2 are provided in columns 704 and 706 respectively. In one or more embodiments, one or more hypervisors can be analyzed for a cluster of hypervisors. The total capacity $R^t$ is provided in row 708 for each hypervisor. The consumed capacity $R^c$ is provided in row 710 for each hypervisor. The available capacity $R^a$ is provided in row 712 for each hypervisor.

In this particular example, Hypervisor 1 has a total capacity of 16 CPU units and Hypervisor 2 has a total capacity of 8 CPU units. Also, Hypervisor 1 is shown as having two virtual servers VM1, VM2 each consuming 4 CPU units of the Hypervisor 1. As a result, the Hypervisor 1 has an available capacity of 8 CPU units. Hypervisor 2 is shown as having two virtual servers VM3, VM4 as consuming 2 and 4 CPU units respectively. As a result, the Hypervisor 2 has an available capacity of 2 CPU units. In an embodiment, if a new virtual server placement request including a CPU capacity request is received, the hypervisor 1 will be selected as the target host because Hypervisor 1 has more available CPU capacity.

In one or more embodiments, two cases can exist when the scheduler and hypervisor metrics are out of synchronization. During this period, the resource usage should not be updated directly from the hypervisor resource optimizer data of the hypervisors, but predictive adjustments should be made.

In a first case, the scheduler makes a decision to place the virtual server ji for a CPU capacity request of $r_{j,i}$ on hypervisor h. Until the actual resource usage metric $c_{j,i}$ from hypervisor h is available, the scheduler should reduce $R^t$ by an amount equal to the CPU capacity request of $r_{j,i}$ from $R_j^t$ to $R_{24}^t$ on hypervisor h, so that CPU resources for virtual server ji are reserved, wherein i identifies a virtual server at importance level j.

In a second case, a virtual server is migrated or deleted from hypervisor h. In this example, a scheduler has already released $r_{j,i}$ for virtual server ji, wherein i identifies a virtual server at importance level j, from the CPU resource accounting of hypervisor h, but the corresponding $c_{j,i}$ exists in hypervisor h feedback data from the last time when CPU resource usage snapshot was updated by the periodic task. The scheduler should increase $R^t$ by resource consumption $c_{j,i}$ from $R_j^t$ to $R_{24}^t$, so that $c_{j,i}$ accounted in hypervisor h in advance rather than waiting for the next updated of the periodic task. The accounting for the resources is determined as follows:

$R^{c,h}$ values are defined as:

$$R_j^{c,h} = \Sigma_{i=0}^n r_{j,i} + R_{(j-1)}^{c,h}$$

where index j is the importance level and runs from 0 to 24 and the boundary condition for $R_{(j-1)}^{c,h}$ when j=0 is $R_{-1}^{c,h}=0$.

$R^{t,h}$ values are defined as:

$$R_j^{t,h} = R_j^{a,h} + \Sigma_{i=0}^m r_{j,i} + R_{(j-1)}^{c,h}$$

where index j is the importance level and runs from 0 to 24. The boundary condition is $R_{(j-1)}^{c,h}$ when j=0 is $R_{-1}^{c,h}=0$.

Now, $R_i^{'t,h}$ is defined as the adjustment amount for the total capacity until the actual resource usage metric becomes available from hypervisor resource optimizer for the scenario outlined in condition 1. Then, $R_i^{'t,h}$ is formulated as follows:

$R_i^{'t,h}=0$ when i<m, that is, for all importance levels above m, $R_i^{'t,h}=r_m$ when i≥m, here $r_m$ is the requested capacity for the virtual server at importance level m newly placed on the hypervisor labeled as h.

It should be noted that once the actual resource usage metric becomes available, $R_i^{'t,h}=0$ for all importance levels i.

Condition 2 is formulated similarly by defining $R_i^{'',t,h}$ as the adjustment amount for total capacity until the actual resource usage metric becomes available from hypervisor resource optimizer.

$R_i^{'',t,h}=0$ when i<m, that is, for all importance levels above m, $R_i^{'',t,h}=r_m$ when i≥m, here $r_m$ is the requested capacity for the virtual server at importance level m newly deleted from or migrated out of the hypervisor labeled as h.

Once the actual resource usage metric becomes available, $R_i^{'',t,h}=0$ for all importance levels i.

$r_{j,i}$ is the CPU capacity request of virtual server i at importance level j; $R_j^{a,h}$ is the available CPU capacity at importance level j on hypervisor h reported by its hypervisor resource optimizer. The available CPU capacity can dynamically change based on workload changes on the hypervisor during run time. In an embodiment, a hypervisor has 25 consumable resources from highest business importance level 0 to the lowest importance level 24 (0≤j≤24). $c_{j,i}$ is the real-time CPU capacity consumption of virtual server ji at importance level j reported by the hypervisor resource optimizer (0≤j≤24). The real-time CPU capacity consumption can change dynamically based on workload change within the virtual server during run time. Available capacity can now be formulated as follows:

$$R_j^{T,h}=R_j^{t,h}-R_j^{',t,h}+R_j^{'',t,h} \qquad \text{Eq. 9}$$

$$R_j^{a,h}=R_j^{T,h}-R_j^{c,h} \qquad \text{Eq. 10}$$

where $R_i^{T,h}$ is the adjusted total capacity on hypervisor h at importance level i until the actual resource usage metrics become available from hypervisor resource optimizer.

In stable state (not in case 1 or case 2 described), the available resource amount will be calculated as follows based on Eq. 4 and Eq. 5, because the available CPU capacity ($R_j^{a,h}$) reported by the hypervisor resource optimizer directly will be reliable.

$$R_j^{T,h}-R_j^{c,h}=R_j^{t,h}-R_j^{',t,h}+R_j^{'',t,h}-R_j^{c,h}=R_j^{t,h}-0+0-$$
$$R_j^{c,h}=R_j^{a,h} \text{ (0≤j≤24)}$$

Note that $R_t^{',t,h}=0$ and $R_i^{'',t,h}=0$ because in stable state the scheduler receives the actual resource usage metrics and these adjustments are set to zero.

Figure 8A:
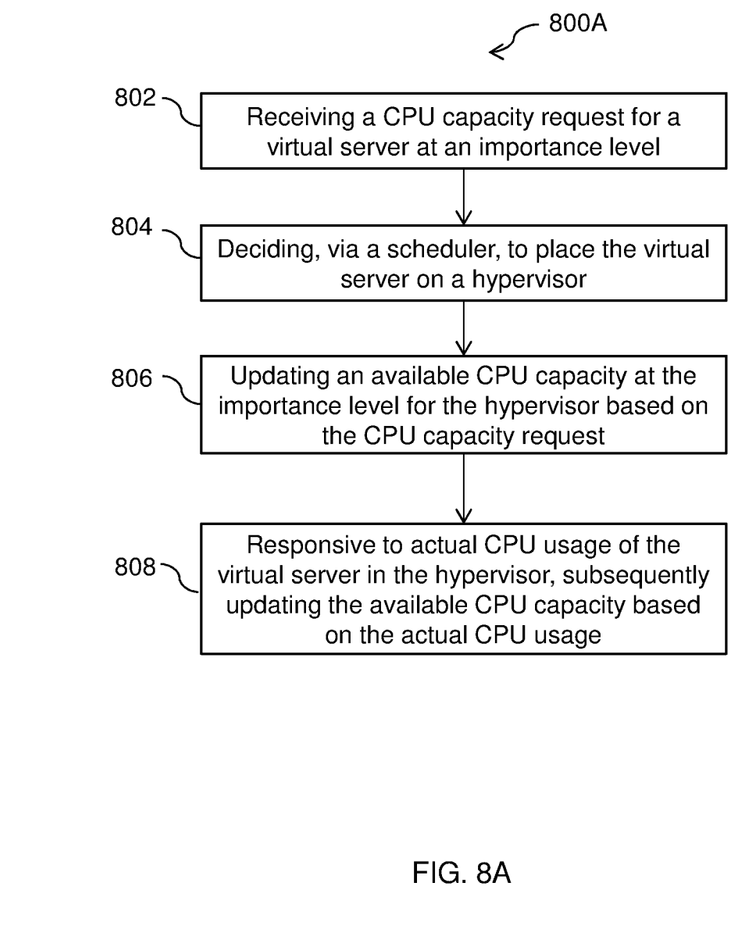
FIG. 8A and FIG. 8B illustrates flow diagrams of a method for predictive virtual server scheduling and optimization of dynamic consumable resources to achieve priority-based workload performance objectives in accordance with one or more embodiments.

Now referring to FIG. 8A a flow diagram 800A illustrating a first case is shown. Block 802 provides receiving a CPU capacity request for a virtual server at an importance level. In one or more embodiments, the CPU capacity request includes a CPU demand for resources and/or a virtual server placement request.

Block 804 includes deciding, via a scheduler, to place the virtual server on a hypervisor of the environment. In one or more embodiments, a delay can be realized between the decision for virtual server placement and the actual placement of the virtual server on the hypervisor. In addition, a delay can exist between resource accounting updates/feedback from the hypervisor resource optimizers of the hypervisors allowing for over-commitments of resources.

Block 806 includes updating an available CPU capacity at the importance level for the hypervisor based on the CPU capacity request. In one or more embodiments, the scheduler will reserve the resources according to the amount of resources of the request and update the available CPU capacity by reducing the accounting based on the requested resources. The update occurs prior to the actual operation of the virtual server and the utilization of the requested resources.

Block 808 includes responsive to actual CPU usage of the virtual server, subsequently updating the available CPU capacity based on the actual CPU usage. In one or more embodiments, after the virtual server is operational the available CPU capacity will be updated based on the real-time usage information. This technique optimizes the actual available CPU capacity. Thereafter the available CPU capacity will be periodically updated with the actual CPU utilization collected during a run time.

Figure 8B:
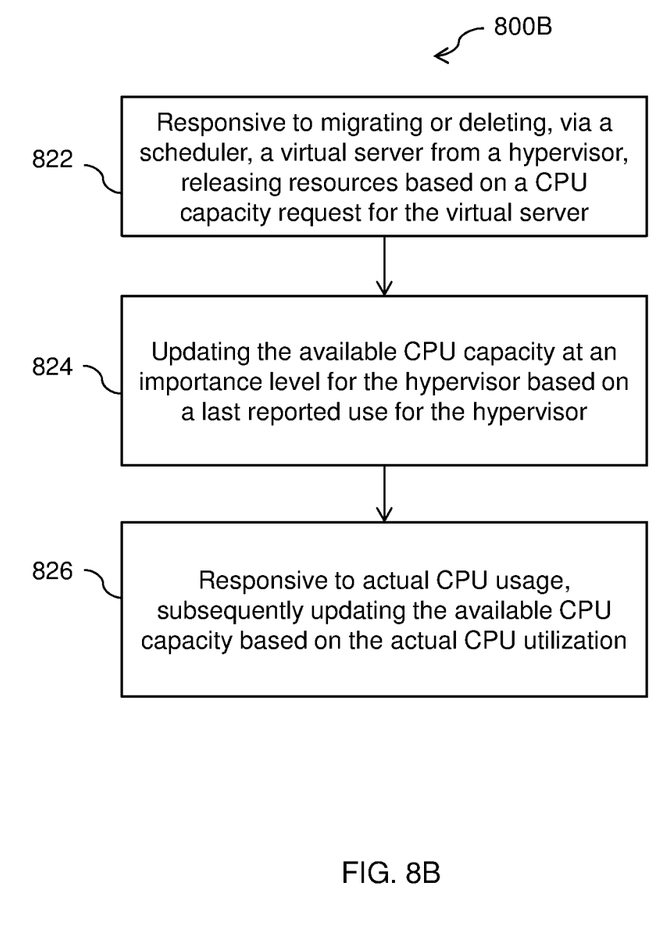

Now referring to FIG. 8B a flow diagram 800B illustrating a second case is provided. Block 822 provides responsive to migrating or deleting a virtual server from a hypervisor, releasing resources based on a CPU capacity request for the virtual server. In one or more embodiments, a scheduler releases the resources based on the request that was received when initially allocating the virtual server.

Block 824 provides updating the available CPU capacity at an importance level for the hypervisor based on a last reported use for the hypervisor. In an embodiment, the available CPU capacity is increased by the last reported use for the deleted hypervisor. In one or more embodiments, the available CPU capacity can be periodically reported by the hypervisor resource optimizer of a hypervisor. Block 826 provides responsive to receiving reported use information, subsequently updating the available CPU capacity based on the actual CPU utilization. Tracking the resources in accordance with an embodiment allows for an accurate accounting of resources in the environment to achieve performance goals.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for predictive virtual server scheduling and optimization of dynamic consumable resources to achieve performance objectives, the computer program product comprising:
   a computer readable storage medium having stored thereon first program instructions executable by a processor to cause the processor to:
   determine an initial allocation of a virtual server to a hypervisor associated with an importance level by:
      calculate a capacity requirement for each virtual server based on an administrator defined performance objective for each virtual server;
      calculate an available CPU capacity for each importance level based on the calculated capacity requirement for each virtual server, wherein each importance level is associated with one or more hypervisors, wherein each importance level indicates a priority over one or more hypervisors of other importance levels of which resources can be taken;
      send the calculated capacity required for each virtual server and the calculated available CPU capacity to a scheduler;
      select, by a scheduler, a target hypervisor based on the calculated capacity requirement of each virtual server and the calculated available CPU capacity at each importance level of each of one or more hypervisors, wherein selection of the target hypervisor selects a hypervisor associated with a lowest importance level, having a most available CPU capacity;
      perform the initial allocation by allocating the virtual server to the selected target hypervisor;
   determine one or more non-performing virtual servers and an associated importance level of the one or more non-performing virtual servers, wherein the non-performing virtual servers are virtual servers that were initially allocated and are not meeting a performance goal;
   if one or more non-performing virtual servers are determined, determine a total needed capacity required by the non-performing virtual servers at the importance level to meet the performance objective;
   compare the total needed capacity with an available capacity of a lower importance level; redistribute the available capacity from the lower importance level to the importance level of the non-performing virtual servers;

compare the total needed capacity to an updated available capacity of the importance level of the one or more non-performing virtual servers;

determine the one or more non-performing virtual servers as candidates for migration based on the comparison of the total needed capacity to the updated available capacity; and rank the non-performing virtual server candidates for migration;

performing the selecting of a new target hypervisor for the ranked candidates; and allocating the ranked candidates to the selected new target hypervisor.

2. The computer program product of claim 1, wherein the available CPU capacity $A_j^h$ of a particular hypervisor h at an importance level j is calculated as follows:

$$A_j^h = A_{j-1}^h - \Sigma_i u_{j,i}^g)$$

where $A_{j-1}^h$ is the available CPU capacity of the hypervisor h at an importance level j+1 and $u_{j,i}^h$ is the capacity requirement to meet performance objective g on a particular virtual server i at an importance level j.

3. The computer program product of claim 1, wherein the instructions are further executable by a processor to cause the processor to:

receive a CPU capacity request for a virtual server at an importance level;

determine to place the virtual server on a hypervisor;

reserve resources based on the CPU capacity request;

update an available CPU capacity at the importance level for the hypervisor based on the CPU capacity request; and responsive to actual CPU usage of the virtual in the hypervisor, subsequently update the available CPU capacity based on the actual CPU usage.

4. The computer program product of claim 1, wherein the instructions are further executable by a processor to cause the processor to:

responsive to migrating or deleting a virtual server from a hypervisor, release resources based on a CPU capacity request for the virtual server;

update the available CPU capacity at an importance level for the hypervisor based on a last reported use for the hypervisor; and periodically update the available CPU capacity of the hypervisor based on actual CPU usage.

5. A system for predictive virtual server scheduling and optimization of dynamic consumable resources to achieve performance objectives, the system comprising:

a scheduler;

one or more hypervisors;

a hypervisor resource optimizer module, located on each hypervisor;

a storage medium, the storage medium being coupled to a processor;

the processor configured to:

determine an initial allocation of a virtual server to a hypervisor associated with an importance level by:

calculate a capacity requirement for each virtual server based on an administrator defined performance objective for each virtual server;

calculate an available CPU capacity at each importance level for each hypervisor based on the calculated capacity requirement for each virtual server, wherein each importance level is associated with one or more hypervisors, wherein each importance level indicates a priority over one or more hypervisors of other importance levels of which resources can be taken;

select a target hypervisor based on the calculated capacity requirement of each virtual server and the calculated available CPU capacity at each importance level of each of the hypervisors, wherein selecting the target hypervisor selects a hypervisor associated with a lowest importance level, having a most available CPU capacity;

perform the initial allocation by allocating the virtual server to the selected target hypervisor;

determine one or more non-performing virtual servers and an associated importance level of the one or more non-performing virtual servers, wherein the non-performing virtual servers are virtual servers that were initially allocated and are not meeting a performance goal;

if one or more non-performing virtual servers are determined, determine a total needed capacity required by the non-performing virtual servers at the importance level to meet the performance objective;

compare the total needed capacity with an available capacity of a lower importance level; redistribute the available capacity from the lower importance level to the importance level of the non-performing virtual servers;

compare the total needed capacity to an updated available capacity of the importance level of the one or more non-performing virtual servers;

determine the one or more non-performing virtual servers as candidates for migration based on the comparison of the total needed capacity to the updated available capacity; and rank the non-performing virtual server candidates for migration;

perform the selecting of a new target hypervisor for the ranked candidates; and allocate the ranked candidates to the selected new target hypervisor.

6. The system of claim 5, wherein the available CPU capacity $A_j^h$ of a particular hypervisor h at an importance level j is calculated as follows:

$$A_j^h = (A_{j-1}^h - \Sigma_i u_{j,i}^g)$$

where $A_{j-1}^h$ is the available CPU capacity of the hypervisor h at an importance level j−1 and $u_{j,i}^g$ is the capacity requirement to meet performance objective g on a particular virtual server i at an importance level j.

7. The system of claim 5, wherein the processor is further configured to:

receive a CPU capacity request for a virtual server at an importance level;

determine to place the virtual server on a hypervisor;

reserve resources based on the CPU capacity request;

update an available CPU capacity at the importance level for the hypervisor based on the CPU capacity request;

responsive to actual CPU usage of the virtual in the hypervisor, subsequently update the available CPU capacity based on the actual CPU usage.

8. The system of claim 5, wherein the processor is further configured to:

responsive to migrating or deleting a virtual server from a hypervisor, release resources based on a CPU capacity request for the virtual server;

update the available CPU capacity at an importance level for the hypervisor based on a last reported use for the hypervisor; and
periodically update the available CPU capacity of the hypervisor based on actual CPU usage.

* * * * *